(12) United States Patent
Amirijoo et al.

(10) Patent No.: US 8,738,004 B2
(45) Date of Patent: May 27, 2014

(54) METHOD AND APPARATUS FOR EXCLUDING NON-MOBILITY DATA FROM MOBILITY KEY PERFORMANCE INDICATORS

(75) Inventors: Mehdi Amirijoo, Linköping (SE); Fredrik Gunnarsson, Linköping (SE); Birgitta Olin, Bromma (SE); Johan Moe, Mantorp (SE); Kristina Zetterberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 106 days.

(21) Appl. No.: 13/503,506

(22) PCT Filed: Mar. 22, 2012

(86) PCT No.: PCT/SE2012/050323
§ 371 (c)(1),
(2), (4) Date: Apr. 23, 2012

(87) PCT Pub. No.: WO2013/066235
PCT Pub. Date: May 10, 2013

(65) Prior Publication Data
US 2013/0115959 A1    May 9, 2013

Related U.S. Application Data

(60) Provisional application No. 61/555,785, filed on Nov. 4, 2011.

(51) Int. Cl.
*H04W 36/00*   (2009.01)
*H04W 24/00*   (2009.01)

(52) U.S. Cl.
USPC .......................................... 455/440; 455/423

(58) Field of Classification Search
None
See application file for complete search history.

(56) References Cited

U.S. PATENT DOCUMENTS

| 2011/0086635 | A1* | 4/2011 | Grob-Lipski | 455/423 |
| 2011/0117908 | A1* | 5/2011 | Huang et al. | 455/423 |
| 2012/0026918 | A1* | 2/2012 | Won et al. | 370/255 |
| 2012/0250498 | A1* | 10/2012 | Johansson et al. | 370/221 |
| 2013/0070679 | A1* | 3/2013 | Wegmann et al. | 370/328 |

FOREIGN PATENT DOCUMENTS

WO    WO 2011/131221    10/2011

OTHER PUBLICATIONS

International Search Report mailed May 31, 2012 in International Application No. PCT/SE2012/050323.
Written Opinion mailed May 31, 2012 in International Application No. PCT/SE2012/050323.

(Continued)

*Primary Examiner* — Erika A Washington
(74) *Attorney, Agent, or Firm* — Nixon & Vanderhye, P.C.

(57) ABSTRACT

Handover (HO) statistics and handover issue events which are due to non-mobility causes are not included in the statistics fed into mobility robustness optimization (MRO). The non-mobility causes may include, e.g., load balancing, retracting users to prepare for cell maintenance or restart/reconfiguration and cell outage including compensation means. Radio link failure (RLF), handover failure (HOF), and handover oscillations (HOosc) that are due to non-mobility cause are excluded from the statistics upon which mobility robustness optimization is based. Non-mobility causes are also differentiated from mobility causes when reporting key performance indicators to an operator.

26 Claims, 14 Drawing Sheets

(56) References Cited

OTHER PUBLICATIONS

KPN: "Impact of BS Probing Hotspot Reactivation Solution on Network Operation", 3GPP Draft; R3-111248, 3$^{rd}$ Generation Partnership Project (3GPP), RAN WG3, Apr. 30, 2011, XP050498182.

CMCC: "Way Forward for CCO", 3GPP Draft; R3-091695 Way Forward for CCO, 3$^{rd}$ Generation Partnership Project (3GPP), Aug. 20, 2009, XP050353078.

ZTE: "Add Coordination Scenario Between MLB and MRO", 3GPP Draft; S5-112967 CR 32.522 REL-11 Add Coordination Scenario Between MLB and MRO, 3$^{rd}$ Generation Partnership Project (3GPP), SA WG5, Oct. 2, 2011, XP050551826.

NGMN, "Operator Use Cases Related to Self Organising Networks," ver. 1.53, Apr. 16, 2007.

Liu, Z., et al. "Conflict Avoidance Between Mobility Robustness Optimization and Mobility Load Balancing," IEEE Global Telecommunications Conference, GLOBECOM 2010.

3GPP TS 36.423, 3$^{rd}$ Generation Partnership Project; Technical Specification Group Radio Access Network; Evolved Universal Terrestrial Radio Access Network (E-UTRAN); X2 Application Protocol (X2AP) (Release 10), V10.5.0, Mar. 2012.

3GPP TS 36.331, 3$^{rd}$ Generation Partnership Project; Technical Specification Group Radio Access Network; Evolved Universal Terrestrial Radio Access (E-UTRA); Radio Resource Control (RRC); Protocol Specification (Release 10), V10.5.0, Mar. 2012.

3GPP TS 36.300, 3$^{rd}$ Generation Partnership Project; Technical Specification Group Radio Access Network; Evolved Universal Terrestrial radio Access (E-UTRA) and Evolved Universal Terrestrial Radio Access Network (E-UTRAN); Overall description; Stage 2 (Release 10), V10.7.0, Mar. 2012.

Schmelz, L.C., et al., "A Coordination Framework for Self-Organisation in LTE Networks," IM 2011, Dublin, Ireland, May 23-27, 2011.

* cited by examiner

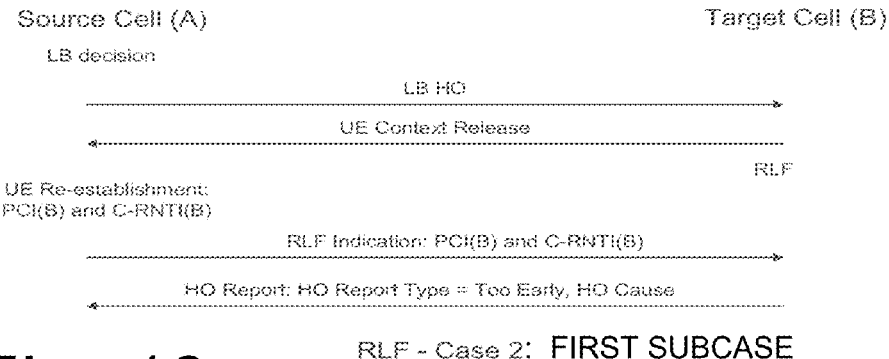
Fig. 19    RLF - Case 2: FIRST SUBCASE
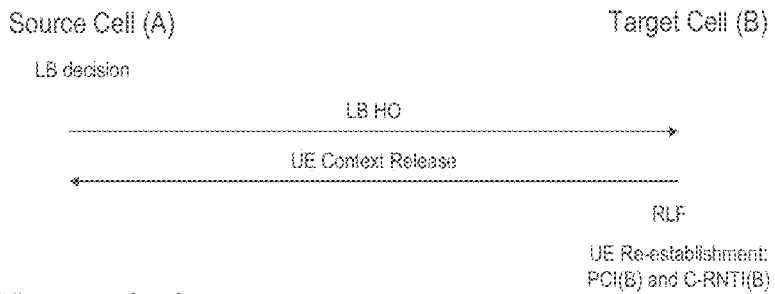
Fig. 20    RLF - Case 2: SECOND SUBCASE
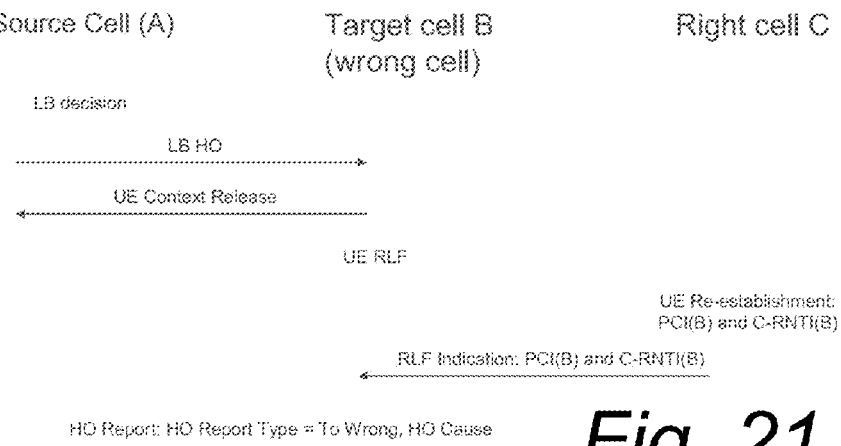
Fig. 21

METHOD AND APPARATUS FOR EXCLUDING NON-MOBILITY DATA FROM MOBILITY KEY PERFORMANCE INDICATORS

This application is the U.S. national phase of International Application No. PCT/SE2012/050323 filed 22 Mar. 2012 which designated the U.S. and claims priority to US Provisional Application No. 61/555,785 filed 4 Nov. 2011, the entire contents of each of which are hereby incorporated by reference.

This application claims the priority and benefit of U.S. provisional patent application 61/555,785 filed Nov. 4, 2011, entitled "Method and Apparatus for Excluding Non-Mobility Data from Mobility Key Performance Indicators", which is incorporated herein by reference in its entirety.

TECHNICAL FIELD

This invention pertains to telecommunications, and particularly to handovers including preparation and/or use of performance indicators relating to handovers.

BACKGROUND

1.0 General Background

In a typical cellular radio system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

1.1 Long Term Evolution (LTE)

The architecture of the LTE system is shown in FIG. 1. In LTE the downlink (e.g. communications from a base station to a wireless terminal) is based on orthogonal frequency division multiplexing (OFDM) while the uplink (e.g. communications from a wireless terminal to a base station) is based on a single carrier modulation method known as discrete Fourier transform spread OFDM (DFT-S-OFDM). See, e.g., Reference [2].

FIG. 1 shows that the E-UTRAN comprises base station (BS) nodes known as eNB nodes, which are connected to each other via the X2 interface. The eNB nodes are connected over the S1 interface to mobility management entities (MME) or serving gateways (S-GW). Both the S1 and the X2 interface may be divided into control plane (dashed lines) and user plane (solid lines) parts.

Admission control aims at ensuring that not more users than the cell can accommodate are admitted into the cell. Some users may have a negotiated service quality level, and such service quality levels should be maintained even when new users are admitted into the cell.

1.2 Load Balancing

Load balancing (LB) or "traffic steering" works by moving users one by one from highly loaded cells to less load cells in order to improve the user performance, e.g., user bit rate. A user being subject for load balancing, e.g., being located at the cell edge with relatively good link conditions to the neighboring cell, may be moved to the neighboring cell in order to balance the load between the two cells.

In another variation of the load balancing function, the handover margin (HOM) (see section 1.5 hereof) of the UEs in a cell may be altered in order to trigger measurements of candidate cells closer or further away from the serving cell depending on the load of the serving and candidate cells. UEs triggering such measurements are considered to be handed over to the reported candidate cell. The handover margin (HOM) may be regularly altered with the ambition to even out the load between cells, or changed when one cell is considered to be in an overload situation or fails to meet the quality of service (QoS) of served users, and a candidate cell is not in an overload situation. In this case the overload cell may hand over several UEs satisfying the handover margin (HOM) criteria to alleviate the overload situation.

1.3 Mobility Robustness Optimization

Mobility robustness concerns handover parameter adjustments. Essentially three situations should be avoided:

Too early handover, meaning that a UE is handed over to a candidate cell too early with a radio link or handover failure as a result. The UE returns soon to the source cell via re-establishment procedures.

Too late handover, meaning that the UE is handed over late to the target cell, so that the link to the source cell breaks before completing the handover.

Handover to wrong cell, meaning that the UE is attempted to be handed over to one target cell but the procedure fails, and soon thereafter the UE re-establishes at another cell. Most probably, it would have been better to have handed over the UE to the last target cell directly.

A mobility robustness optimization (MRO) mechanism may adjust one or more of the following handover parameters controlling the event driven reporting of the UE:

A threshold indicating how much stronger a certain candidate cell needs to be before it is reported to the serving cell.

A filter coefficient applied to the measurement before evaluation triggers are considered.

A time to trigger, e.g., the time window within which the triggering condition needs to be continuously met in order to trigger the reporting event in the UE.

For example, a higher 'too early handover' ratio than desired may be counter-acted by increasing the threshold, or delaying the report event trigger.

Another example, a higher 'handover to wrong cell' ratio than desired may be counter-acted by increasing the threshold towards the first, unwanted, target cell.

1.4 Handover (HO) Oscillation

An example of an oscillation is shown in FIG. 2. If T is less than a time period known as $T_{osc}$, then the HO is considered as an oscillation. The oscillation rate may be defined as the ratio between the number of oscillations and the total number of HOs. There is an upper boundary for an acceptable oscillation rate originating from e.g., core network load. Also the oscillation rate is related to end-user performance. On one hand oscillation are harmful as this induces additional signalling and delays, and on the other hand, oscillations allow the user to be connected to the best cell. This needs to be balanced in order for the end-user to experience the best performance.

1.5 Handover Margin and Time-to-Trigger

The handover margin (HOM) is the difference between the radio quality of the serving cell and the radio quality needed before attempting a handover. The radio quality is measured either using RSRP or RSRQ (see reference [5] for further explanation).

The UE triggers the intra-frequency handover procedure by sending a report known as an eventA3 report to the eNB. This event occurs when the UE measures that the target cell is better than the serving cell with a margin "HOM". The UE is configured over RRC when entering a cell, and the handover margin (HOM) is calculated from the following configurable parameters:

$$HOM=Ofs+Ocs+Off-Ofn-Ocn+Hys$$

where:
Ofs is the frequency specific offset of the serving cell
Ocs is the cell specific offset of the serving cell
Off is the a3-Offset
Ofn is the frequency specific offset of the neighbor cell
Ocn is the cell specific offset of the neighbor cell
Hys is the hysteresis Thus the handover margin (HOM) may be changed by modifying one or more of these parameters. For inter-frequency handover a similar formula is used.

Time-to-trigger is the time period required before triggering a handover attempt. During this time the neighbor cell shall have better radio quality, and then the handover attempt is triggered.

The foregoing are further explained in reference [3].

1.6 Handover (HO) Cause

Once the serving cell has decided to perform a handover based on measurement reports received from the UE, the source cell performs a Handover Request over X2 AP, as basically shown in FIG. 3A. See also 3GPP TS 36.423, incorporated herein by reference.

In the HANDOVER REQUEST message, the source eNB must indicate the cause of the HO, which may be, e.g.:
Handover Desirable for Radio Reasons,
Resource Optimization Handover,
Reduce Load in Serving Cell Thus the target eNB knows that the handover is due to resource optimization or to reduce the load in the serving cell. A similar signalling may be routed via S1 links and the MME, see S1 AP, 3GPP TS 36.413, incorporated herein by reference.

1.7 Handover Preparation Failure

The target cell may be unable to admit the user intended for handover, and in such case the handover request may be denied by a Handover Preparation Failure, as illustrated in FIG. 3b. The cause in such a case may be one of the following:
No Radio Resources Available in Target Cell
Cell not Available
HO Target not Allowed 1.8 RRC Connection Reestablishment Following a Radio Link Failure (RLF) or a handover failure, the UE may perform RRC Connection Reestablishment, as shown in FIG. 4. See also 3GPP TS 36.331, incorporated herein by reference.

The UE shall set the UE-identity of the RRCConnectionReestablishmentRequest message as follows:
C-RNTI used in the source cell
physical cell identity (PCI) of the source cell
shortMAC-I Using the above the last serving cell may identify the UE.

1.9 Radio Link Failure (RLF) Report

Following an RRC Connection Reestablishment as a result of a radio link failure (RLF), the eNB may send a UEInformationRequest message to the UE, as shown in FIG. 5 [see also 3GPP TS 36.331, incorporated herein by reference].

If the eNB requests for an RLF report in the UEInformationRequest message and the UE has such information, then the UE provides the following information to the eNB:

The E-UTRAN Cell Global Identifier/Identity (E-CGI) of the last cell that served the UE (in case of RLF) or the target of the handover (in case of handover failure). If the E-CGI is not known, the PCI and frequency information are used instead.

E-CGI of the cell where the re-establishment attempt was made.

E-CGI of the cell that served the UE at the last handover initialization, i.e., when message 7 (RRC Conn. Reconf) was received by the UE, as presented in FIG. 10.1.2.1.1-1.

Time elapsed since the last handover initialization until connection failure.

An indication whether the connection failure was due to radio link failure (RLF) or handover failure.

Reference Signal Received Power (RSRP) and Reference Signal Received Quality (RSRQ) of the serving cell and the neighboring cells detected by UE at the radio link failure (RLF) event.

Using the information above the eNB may deduce whether the radio link failure (RLF) was due to incorrect handover parameters (too early, too late) or due to a coverage hole (no cell with sufficient signal strength).

1.10 Radio Link Failure Indication

A purpose of the Radio Link Failure Indication procedure [see, e.g., 3GPP TS 36.423, incorporated herein by reference] is to transfer information regarding RRC re-establishment attempts between eNBs controlling neighbouring cells. The signalling takes place from the eNB at which a re-establishment attempt is made to an eNB to which the UE concerned may have previously been attached prior to radio link failure. A radio link failure (RLF) indication is illustrated in FIG. 6.

The eNB2 initiates the procedure by sending the RLF INDICATION message (shown by way of example in FIG. 6) to eNB1 following a re-establishment attempt from a UE at eNB2, when eNB2 considers that the UE may have previously been served by a cell controlled by eNB1.

The eNB2 may include the UE RLF Report (see Section 1.9 hereof) in the RLF INDICATION message, which may be used by the eNB1 to determine the nature of the failure.

The RLF INDICATION message sent from eNB B to eNB A may contain the following information elements:
Failure Cell ID: PCI of the cell in which the UE was connected prior to the failure occurred;
Reestablishment Cell ID: ECGI of the cell where RL re-establishment attempt is made;
C-RNTI: C-RNTI of the UE in the cell where UE was connected prior to the failure occurred;
shortMAC-I (optionally): the 16 least significant bits of the MAC-I calculated using the security configuration of the source cell and the re-establishment cell identity.

1.11 Handover Report

An eNB initiates the procedure by sending an HANDOVER REPORT message to another eNB controlling neighboring cells, as generally illustrated in FIG. 7. By sending the HANDOVER REPORT message, $eNB_1$ indicates to $eNB_2$ that, following a successful handover from a cell of $eNB_2$ to a cell of $eNB_1$, a radio link failure occurred and the UE attempted RRC Re-establishment either at the original cell of $eNB_2$ (Handover Too Early), or at another cell (Handover to Wrong Cell). The detection of Handover Too Early and Handover to Wrong Cell events is made according to TS 36.300.

The HANDOVER REPORT message typically includes the Handover Cause (see Section 1.6 hereof).

The Handover Report procedure is used in the case of recently completed handovers, when a failure occurs in the target cell (in eNB B) shortly after it sent the UE Context Release message to the source eNB A. The Handover Report procedure is also used in case of unsuccessful handovers, if the random access procedure in the target cell was completed successfully. The HANDOVER REPORT message contains the following information:
Type of detected handover problem (Too Early Handover, Handover to Wrong Cell);
ECGI of source and target cells in the handover;
ECGI of the re-establishment cell (in the case of Handover to Wrong Cell);
Handover cause (signalled by the source during handover preparation).

2.0 Problems with Existing Technology

In deployments where mobility robustness optimization (MRO) and mobility load balancing (MLB) are running concurrently, there is a probability that mobility load balancing (MLB) actions impact mobility robustness optimization (MRO) statistics. If the MLB function moves a user between two cells due to load reasons and this user is faced with a radio link failure (RLF) or fulfills the oscillation criteria, then this information is included in the radio link failure (RLF) and oscillation statistics upon which mobility robustness optimization (MRO) is based. As such there is a risk that mobility robustness optimization (MRO) will react to the radio link failure (RLF) and handover oscillations caused by mobility load balancing (MLB). Moreover, the key performance indicators reported to the network management system are also affected and may present unfavorable mobility robustness optimization (MRO) performance.

Reference [3] discusses a method for avoiding conflicts between MRO and MLB. Reference [4] takes a more general approach to Self-Organizing Networks (SON) coordination. In 3GPP document 36.300 it is mentioned: The radio measurements contained in the RLF Report may be used to identify coverage issues as the potential cause of the failure. This information may be used to exclude those events from the MRO evaluation of intra-LTE mobility connection failures and redirect them as input to other algorithms. As such separation of radio link failures (RLF) due to coverage hole and due to inappropriate handover parameters is already known.

In a current approach, mobility robustness optimization (MRO), and other non-mobility causes impact radio link failure (RLF), handover failure (HOF), and HO oscillation rate, as illustrated in FIG. 9, since:
MRO is altering the conditions under which the UE is handed over to target cell
Load balancing is moving users between cells as a result of load imbalance
Other non-mobility causes, e.g., retracting users to prepare for cell maintenance or restart/reconfiguration and cell outage including compensation means, will change serving cell of users and thereby also mobility statistics. Moreover, admission rejects will cause failures not related to the mobility itself

SUMMARY

In accordance with an aspect of the technology disclosed herein, handover (HO) statistics and handover issue events, including radio link failure (RLF), handover failure (HOF), and HO oscillations, which are due to non-mobility causes, e.g., load balancing, retracting users to prepare for cell maintenance or restart/reconfiguration, cell outage including compensation means, and failures due to admission rejects are not included in the statistics fed into mobility robustness optimization (MRO). As one of its aspects, the technology disclosed herein identifies and excludes radio link failure (RLF), handover failure (HOF), and handover oscillations (HOosc) that are due to non-mobility cause from the statistics upon which mobility robustness optimization is based. This is also considered when reporting key performance indicators to the operator with respect to mobility, but also to other features than mobility. The technology disclosed herein may be applied to other types of networks and standards, e.g., GSM and UTRAN. E-UTRAN is used merely as an exemplifying standard to illustrate the main concept.

In one of its aspects the technology disclosed herein concerns a node of a telecommunications system configured to exclude, from a mobility robustness operation, a handover issue event that has non-mobility causation.

In an example embodiment the node comprises a mobility robustness unit that maintains mobility robustness statistics; and a non-mobility causation filter that excludes the handover issue event that has non-mobility causation from statistics maintained by the mobility robustness unit.

In an example embodiment the node further comprises a handover unit that controls performance of a handover of a wireless terminal in dependence on a value of a handover parameter; and the mobility robustness unit adjusts the value of the handover parameter in dependence on the statistics.

In an example embodiment further the node further comprises an electronic circuit which comprises the mobility robustness unit and the non-mobility causation filter.

In an example embodiment the handover issue event comprises a radio link failure (RLF), a handover failure (HOF), or a handover oscillation. These may be associated to cause indications.

In an example embodiment the non-mobility causation comprises an event not due to radio condition changes related to mobility.

In an example embodiment the non-mobility causation comprises load balancing; retraction of users for cell maintenance and/or restart/reconfiguration purposes; cell outage; and admission rejections.

In an example embodiment the non-mobility causations are configured by a different network node, such as an operations and maintenance node.

In another example embodiment, the mobility causations are configured by a different network node, such as an operations and maintenance node. The non-mobility causation filter will only pass events that matches the mobility causation list.

In another of its aspects the technology disclosed herein concerns a method of operating a node of a telecommunications system. In an example mode and embodiment the method comprises: determining if a handover issue event for a wireless terminal has non-mobility causation; and, if so, excluding the handover issue event from a mobility robustness operation.

In an example mode and embodiment, the mobility robustness operation comprises a mobility robustness statistics operation.

In an example mode and embodiment, the method further comprises using the mobility robustness operation to adjust a handover parameter.

In an example mode and embodiment, the handover issue event comprises a radio link failure (RLF), a handover failure (HOF), or a handover oscillation.

In an example mode and embodiment, the non-mobility causation comprises load balancing; retraction of users for cell maintenance and/or restart/reconfiguration purposes; cell outage; and admission rejection.

In an example mode and embodiment, the set of non-mobility causations in the node is configured by another network node, for example an Operations and Maintenance (O&M) node.

In another example mode and embodiment, the set of mobility causations are configured by a different network node, such as an operations and maintenance node. In this example embodiment the non-mobility causation filter will only pass events that matches a mobility causation in the set of mobility causations.

In an example mode and embodiment wherein the node is a source base station (BS) node, the method further comprises the node determining that the handover issue event has the non-mobility causation upon receiving a handover failure code and a C-RNTI of the wireless terminal from the wireless terminal upon occurrence of RRC Connection Establishment in the source base station (BS) node.

In an example mode and embodiment wherein the node is a source base station (BS) node, the method further comprises the node determining that the handover issue event has the non-mobility causation upon receiving a radio link failure (RLF) indication message from a target cell upon occurrence of the wireless terminal performing RRC Connection Establishment in the target cell, the radio link failure (RLF) indication message including a C-RNTI of the wireless terminal.

In an example mode and embodiment wherein the node is a source base station (BS) node, the method further comprises the node receiving a handover report from another cell and determining from a handover cause indicator in the handover report that the handover issue event has the non-mobility causation.

In another of its aspects the technology disclosed herein concerns a method in a communication system in association with a handover parameter tuning mechanism based on mobility statistics. In an example mode and embodiment the method comprises: identifying if a handover issue event is associated to a non-mobility cause; and, if so, excluding the identified handover issue event data from mobility statistics.

In an example mode and embodiment, the method further comprises presenting mobility statistics with identified handover issue events excluded as performance statistics.

In an example mode and embodiment, the method further comprises presenting excluded identified handover issue events as separate statistics.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 14-FIG. 22 are diagrammatic views illustrating differing cases of operation described herein.

DETAILED DESCRIPTION

Figure 1:
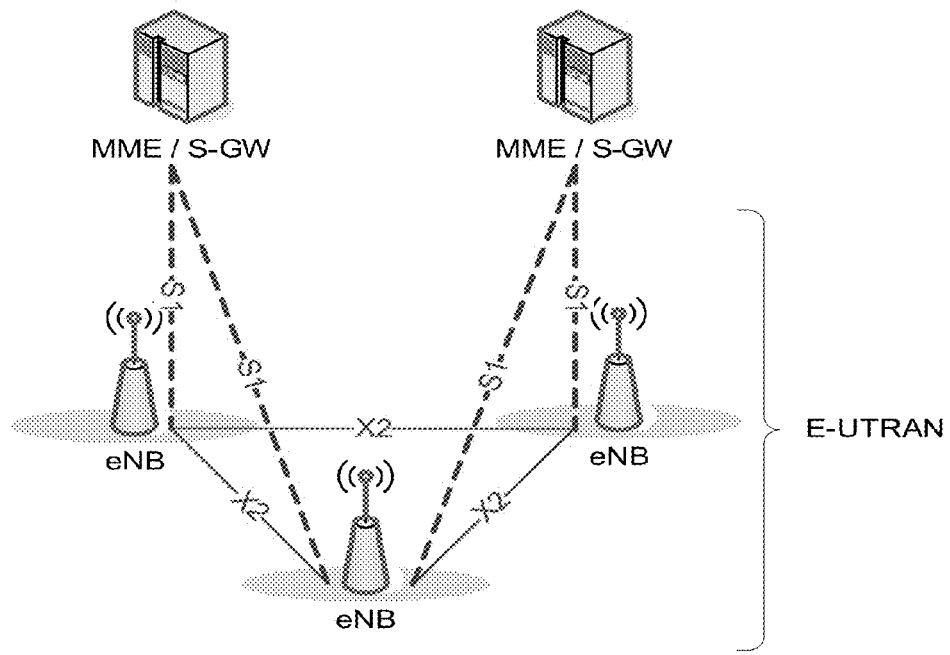
FIG. 1 is a diagrammatic view illustrating general architecture of a Long Term Evolution (LTE) system.

In the following description, for purposes of explanation and not limitation, specific details are set forth such as particular architectures, interfaces, techniques, etc., in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network As used herein, the term "node" may encompass nodes using any technology including, e.g., high speed packet access (HSPA), long term evolution (LTE), code division multiple access (CDMA) 2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

3.0 General Architecture and General Operation

In accordance with an aspect of the technology disclosed herein, handover (HO) statistics and handover issue events (including radio link failure (RLF), handover failure (HOF), and HO oscillations) which are due to non-mobility causes/causation are not included in the statistics fed into mobility robustness optimization (MRO). "Non-mobility causes" and "non-mobility causation" as used herein means or includes cases where handover is triggered as a consequence of planned or incidental events which are not due to radio conditions changes related to mobility, as explained, for example, in section 3.3 hereof. In an example embodiment, non-mobility causes/causation include load balancing, admission rejection, retracting users to prepare for cell maintenance or restart/reconfiguration, and cell outage including compensation means. By contrast, if a mobile (e.g., "user equipment unit (UE)" or "wireless terminal") is handed over to a target cell due to radio conditions, then the cause is due to mobility and not non-mobility causation.

In one example embodiment and mode, the technology disclosed herein identifies and excludes radio link failure (RLF), handover failure (HOF), and handover oscillations (HOosc) that are due to non-mobility cause from the statistics upon which mobility robustness optimization is based. This is also considered when reporting key performance indicators to the operator with respect to mobility, but also to other features than mobility.

In another example embodiment and mode, the technology disclosed herein comprises receiving non-mobility causations (e.g., a list of non-mobility causations) from a different network node. The different network node may be or comprise a node in the operations and maintenance system. Another option or variation is to receive the mobility causations instead, and for the non-mobility causation filter to only pass events that matches the mobility causation list.

Figure 10:
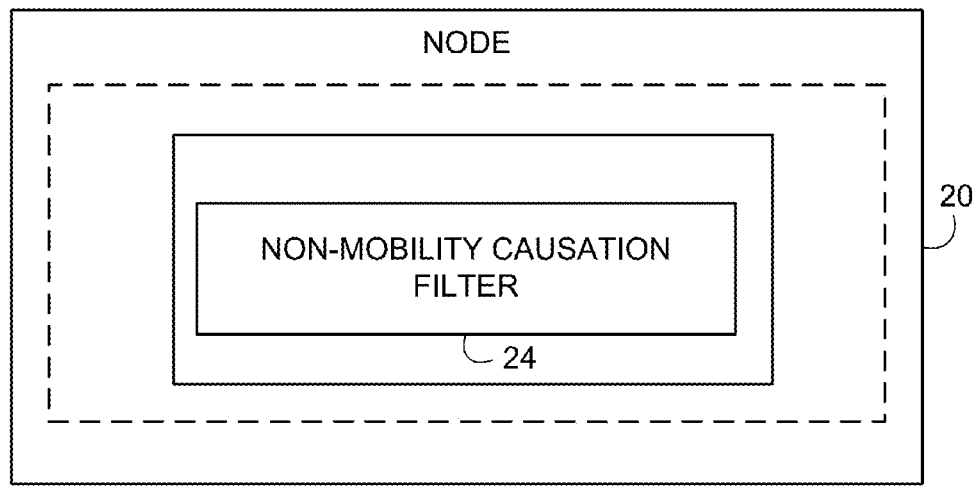
FIG. 10 is a schematic view of an example node which is configured to exclude, from a mobility robustness operation, a handover issue event that has non-mobility causation.

FIG. 10 shows an example node 20 of a communications system, such as (for example) the communications system shown in FIG. 1. Node 20 is configured to exclude, from a mobility robustness operation, a handover issue event that has non-mobility causation. As shown in FIG. 10, the node comprises a non-mobility causation filter 24, among other possible units and functionalities of the node 20. The node 20 of FIG. 10 may be any appropriate network node, such as a node of a radio access network. Thus, in some example embodiments and modes the node 20 may be a base station (BS) node. For example, in the context of Long Term Evolution (LTE), the node 20 of FIG. 10 may take the form of an eNodeB (eNB). The person skilled in the art understands other functionalities and units which are included in a base station (BS) node, and in an eNB node for the LTE environment. In other example embodiments and modes the node 20 may be a radio network controller or base station controller, which is in turn controlling base stations, and is responsible for mobility and some non-mobility mechanisms. If the technology disclosed herein is implemented in an architecture as in UTRAN or GERAN, then the radio network controller is an appropriate node for the implementation and communication/disclosure of the failure cases may be based on signaling over the interface between the radio network controller and controlled base stations, as well as the interface between radio network controllers.

As used herein, a "handover issue event" comprises a radio link failure (RLF), a handover failure (HOF), or a handover oscillation. As explained herein, "non-mobility causation" comprises an event not due to radio condition changes related to mobility. For example, "non-mobility causation" comprises an event such as load balancing; admission rejection; retraction of users for cell maintenance and/or restart/reconfiguration purposes; and, cell outage.

An approach provided by the technology disclosed herein is illustrated in

Figure 11:
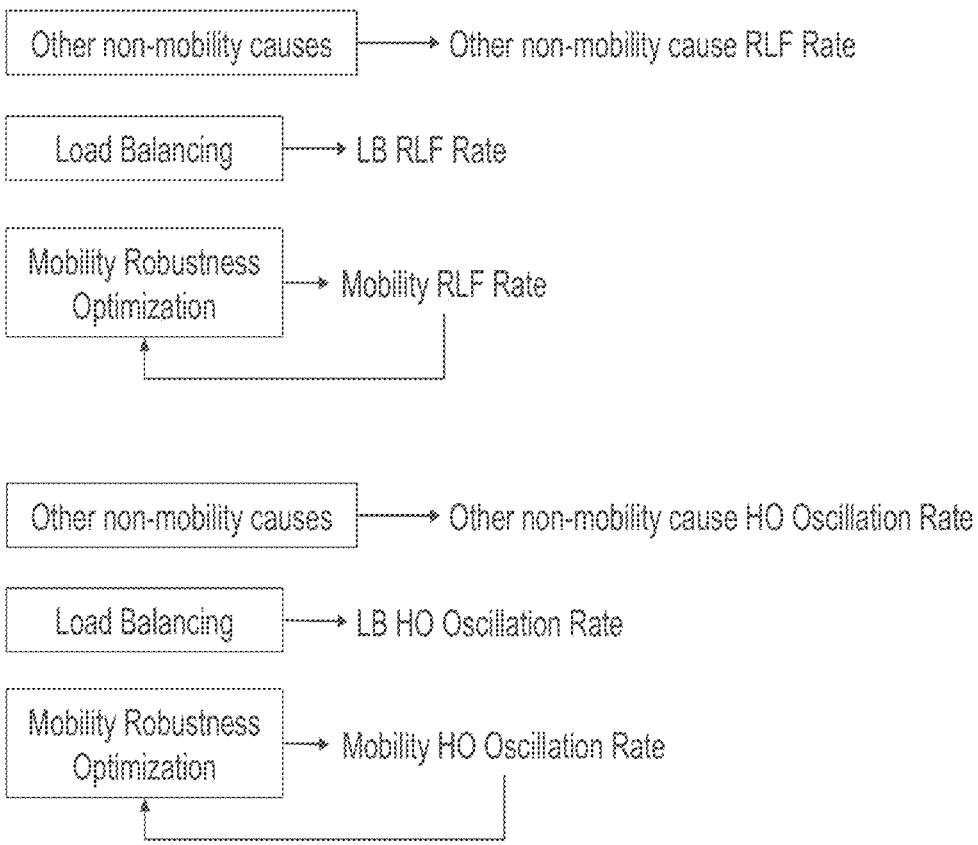
FIG. 11 is a diagrammatic view depicting, e.g., exclusion of handover issue events having non-mobility causation from mobility robustness statistical operations.

FIG. 11. FIG. 11 shows, for example, separation based on the causes of handover issue events such as radio link failure (RLF), handover failure (HOF), and HO oscillation rate. In one of its aspects the technology disclosed herein distinguishes the cases where a radio link failure (RLF) or handover failure (HOF) [due, e.g., to too late handover, too early handover, or handover to wrong cell] in relation to mobility on one hand, or due to load balancing or other non-mobility causes, on the other. This also holds for HO oscillation rate, where oscillations due to load balancing (LB) or other non-mobility causes shall be separated with oscillations due to variations in signal strength resulting in mobility.

Figure 12:
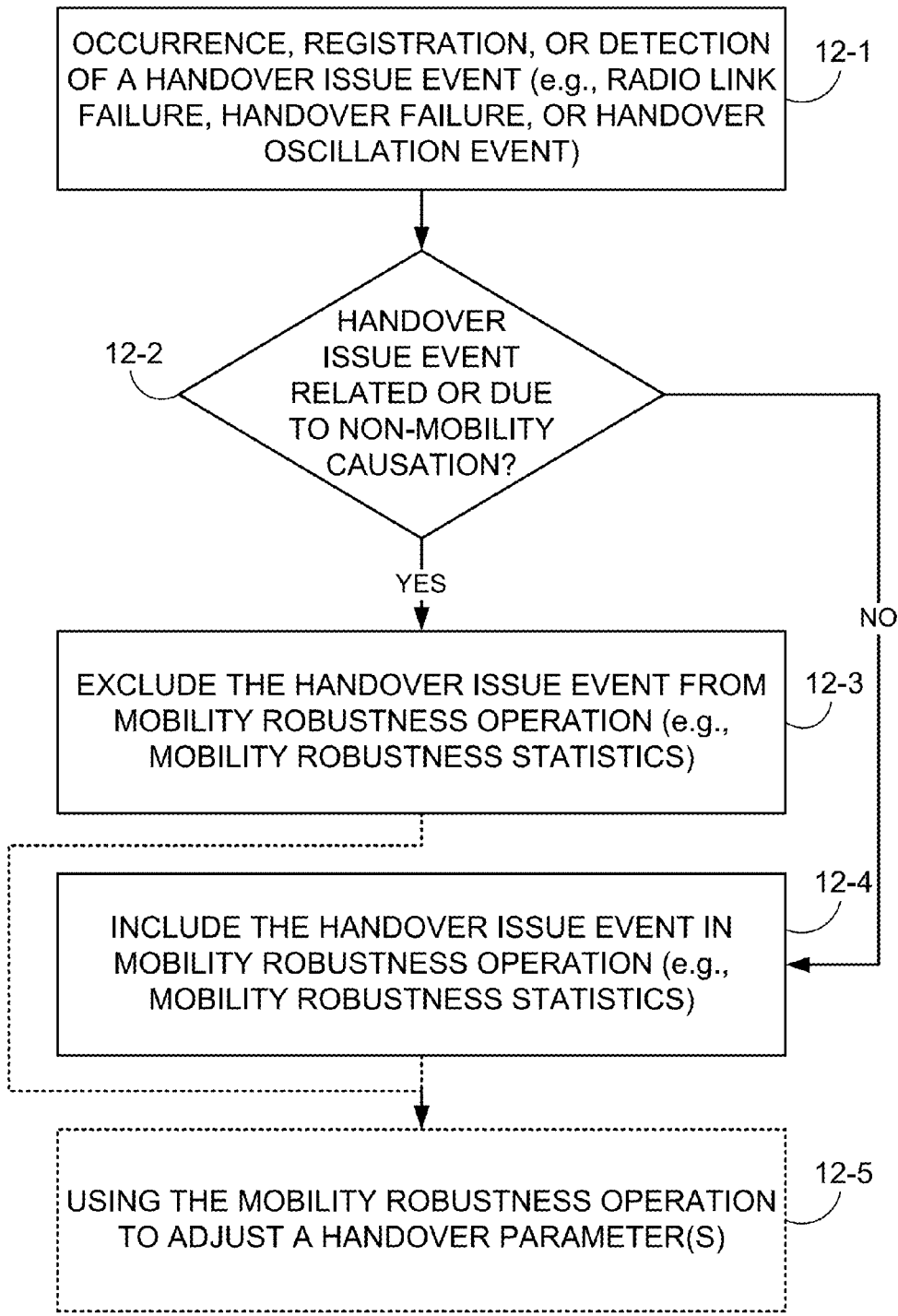
FIG. 12 is a flowchart which shows example acts or steps performed in accordance with a basic, generic mode and embodiment of the technology disclosed herein.

FIG. 12 is a flowchart which shows example acts or steps performed in accordance with a basic, generic mode and embodiment of the technology disclosed herein. Act 12-1 comprises making a determination whether there is an occurrence, registration, or detection of a handover issue event. Act 12-2 comprises determining whether the handover issue event is related to or due to non-mobility causation. If the handover issue event is related to or due to non-mobility causation, act 12-3 is performed. Act 12-3 comprises excluding the handover issue event from a mobility robustness optimization (MRO) operation. The exclusion of act 12-3 is performed by non-mobility causation filter 24, which prevents the handover issue event from being considered in statistics operation maintained, e.g., by node 20 or even by a network manager. If the handover issue event is not related to or due to non-mobility causation, act 12-4 is performed. Act 12-4 comprises including the handover issue event in a mobility robustness optimization (MRO) operation, e.g., including the handover issue event in the statistics maintained by statistics operation. As indicated above, the mobility robustness optimization (MRO) operation may comprise gathering or processing statistics related to mobility robustness. As a further optional act shown in broken lines in FIG. 12, the method may further comprise (act 12-5) using the mobility robustness operation to adjust a handover parameter.

It should be noted that the technology disclosed herein may be applied to other types of networks and standards, e.g., GSM and UTRAN. E-UTRAN is used merely as an exemplifying standard to illustrate the main concept.

In some example embodiments it is beneficial to distinguish between (1) mobility statistics during normal conditions and (2) periods of time following an incidental and planned event, e.g., cell outage, PCI changes (barring the cell), and software upgrade.

Figure 13:
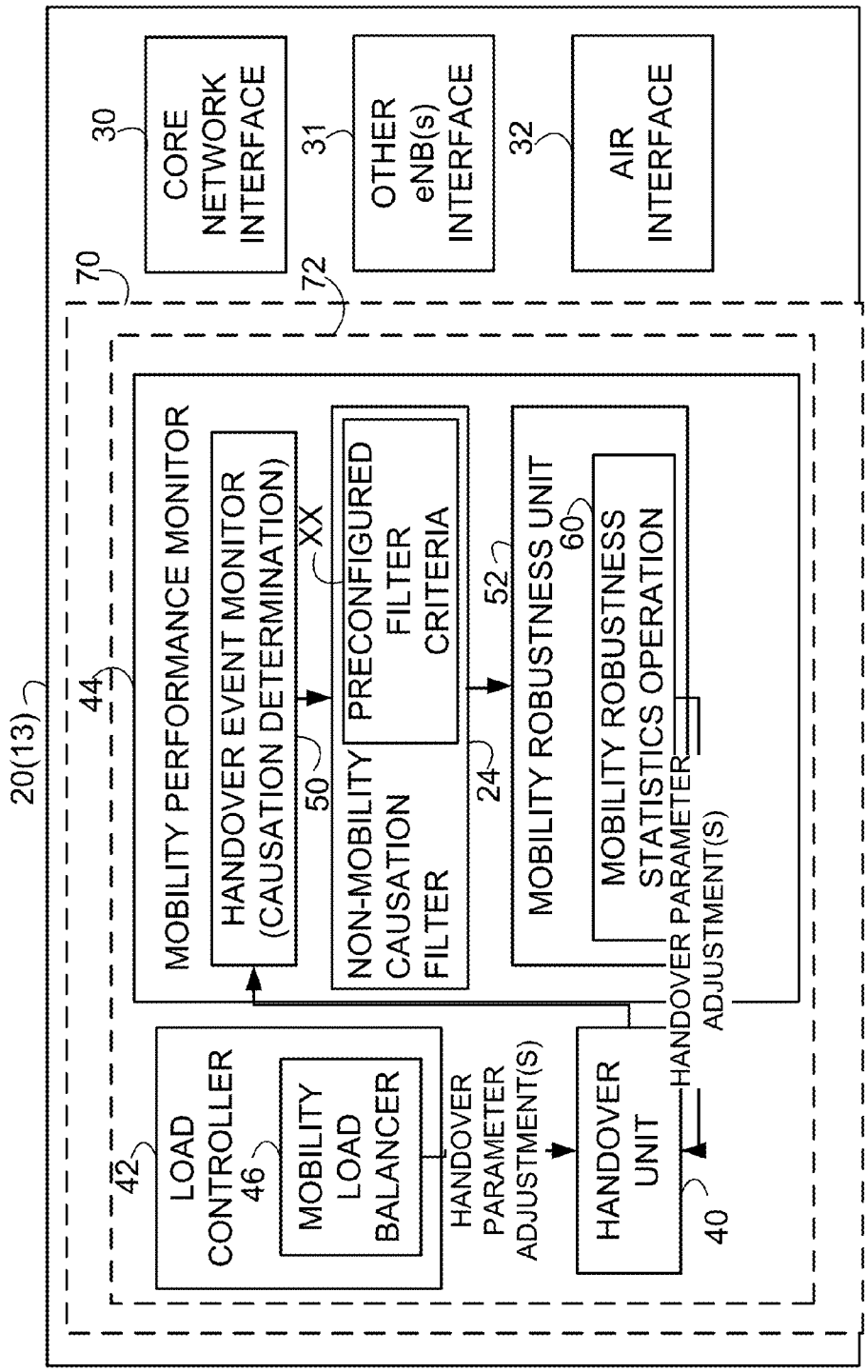
FIG. 13 is a schematic view of an example embodiment in which the node of FIG. 10 takes the form of a base station (BS) node.

As mentioned above, the node which excludes the handover issue event having non-mobility causation may be a base station (BS) node. A non-limiting example embodiment of such a base station (BS) node 20(13) is illustrated in FIG. 13. The example base station (BS) node 20(13) of FIG. 13 comprises various interfaces, such as an interface 30 to a core network, interface(s) 31 to other base station (BS) nodes, and an interface 32 to wireless terminals (over an air interface). In the Long Term Evolution (LTE) context, such interfaces may be understood with reference to the LTE architecture of FIG. 1, for example. The base station (BS) node 20(13) of FIG. 13 further comprises handover unit 40; load controller 42; and mobility performance monitor 44. In an example implementation load controller 42 may comprise mobility load balancing (MLB) unit, e.g., mobility load balancer 46. In an example implementation mobility performance monitor 44 comprises handover event monitor 50, the previously mentioned non-mobility causation filter 24, and mobility robustness unit 52. The mobility robustness unit 52 comprises mobility robustness statistical operation, unit, or functionality 60. Output of mobility robustness unit 52 may be applied to handover unit 40 and used thereby to adjust a value of a handover parameter as shown in FIG. 13.

Figure 13A:
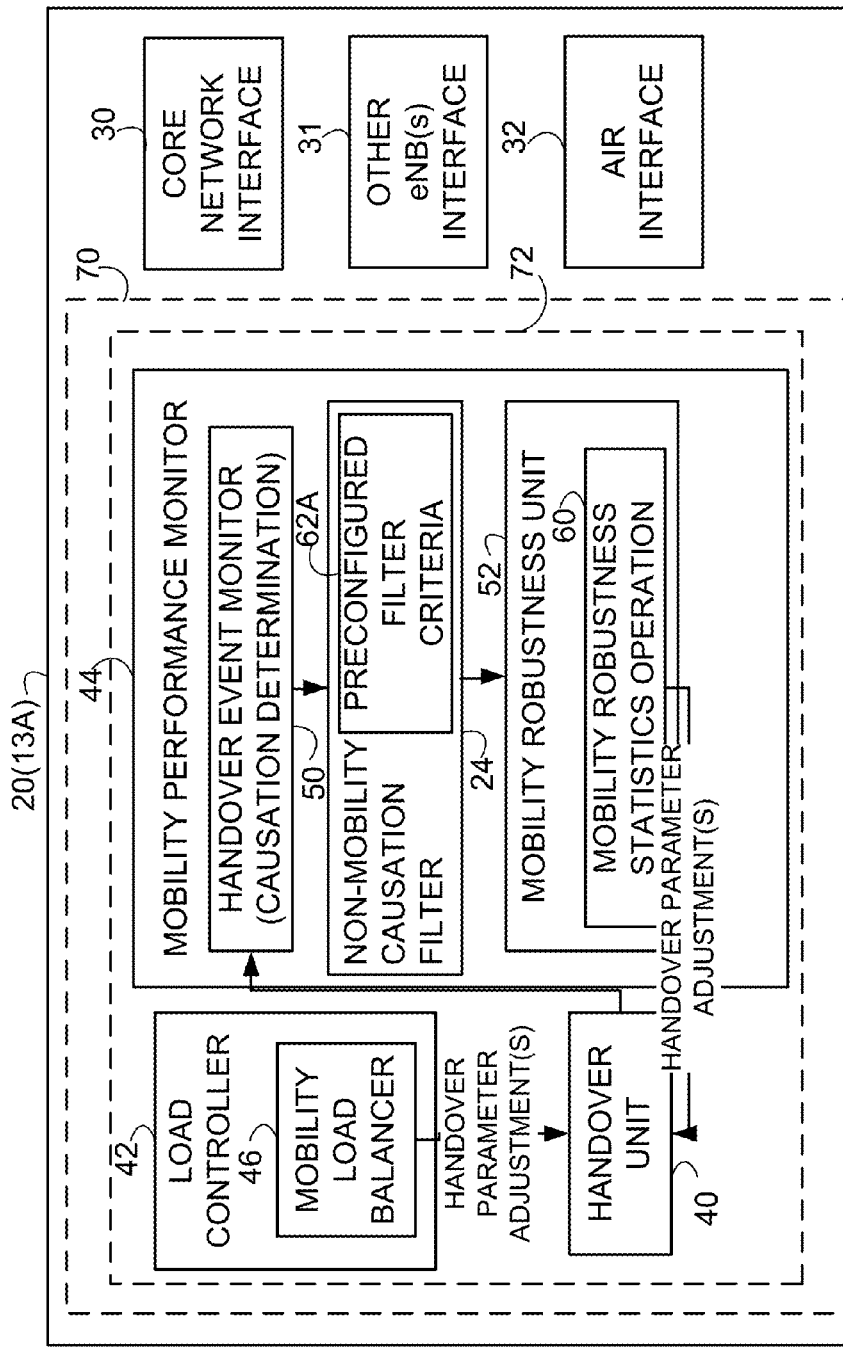
FIG. 13A and FIG. 13B are schematic views of example implementations of the node of FIG. 13 with regard to reception of filter criteria.

FIG. 13A shows an non-limiting example implementation of base station (BS) node 20(13A) in which the non-mobility causation filter 24 comprises a memory or the like which includes pre-configured filter criteria 62A, e.g., information which can be used to determine, or which specifies, how the non-mobility causation filter 24 is to assess what constitutes non-mobility causation. The pre-configured filter criteria may be pre-loaded or pre-configured into base station node 20(13A) through an appropriate user interface device upon installation or upgrading/revision of programmable instructions included in the operating system of the base station node 20(13A).

Figure 13B:
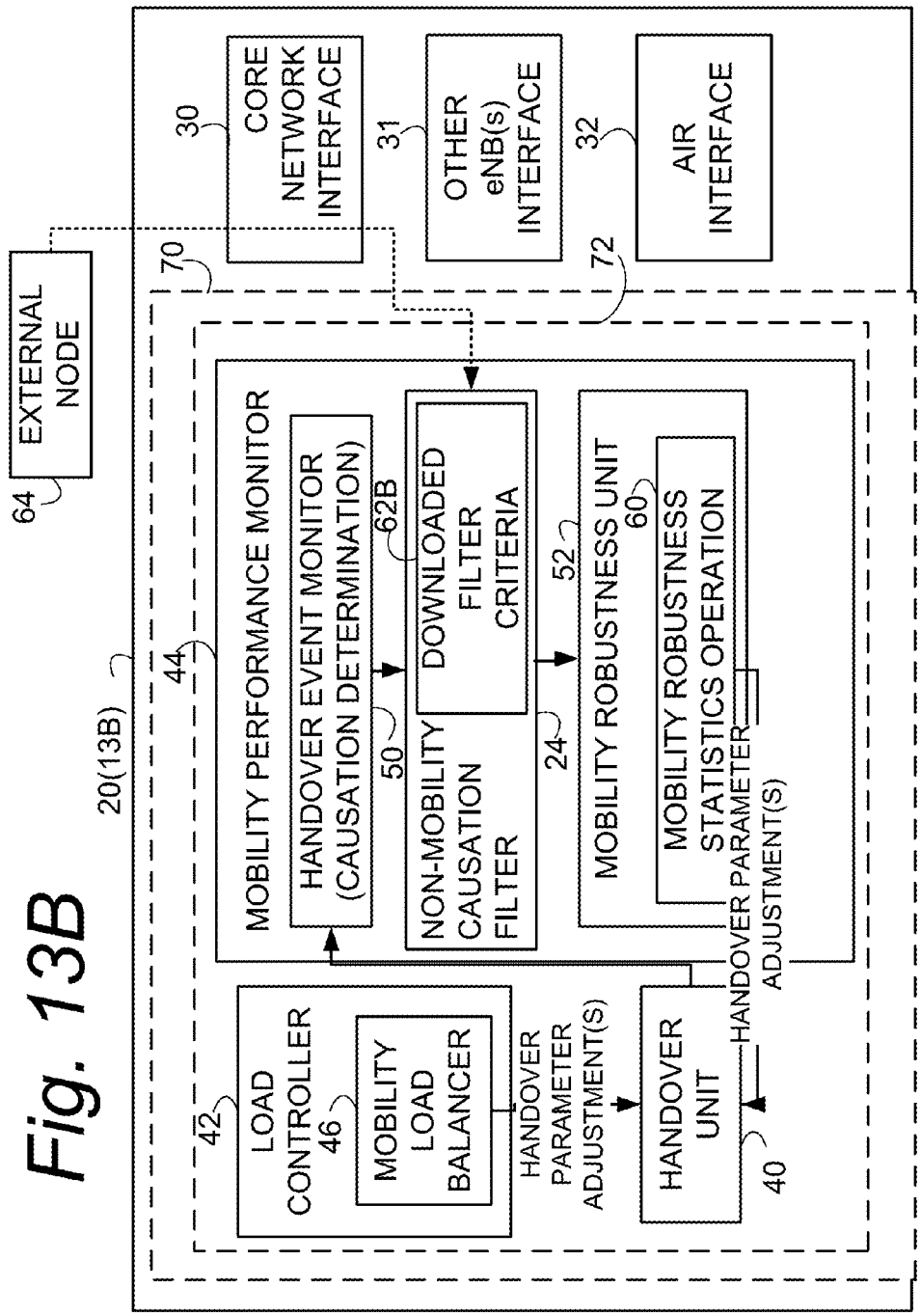

FIG. 13B shows an non-limiting example implementation of base station (BS) node 20(13B) in which the non-mobility causation filter 24 comprises a memory or the like into which filter criteria 62B is downloaded from a different or external node 64. The external node 64 may be a node or server which is external to the base station node 20(13B), and even external to the radio access network. For example, the external node 64 may comprises a node in the operations and maintenance (e.g., O&M) system, such as the network manager shown in FIG. 8. The downloaded filter criteria 62B similarly comprises information which can be used to determine, or which specifies, how the non-mobility causation filter 24 is to assess what constitutes non-mobility causation. The downloaded filter criteria 62B may take the form of a list of non-mobility causations from the external node 64. Alternatively, the downloaded filter criteria 62B may take the form of a list of non-mobility causations from the external node 64, in which case the non-mobility causation filter will only pass events that match the mobility causation list. In other words, the downloaded filter criteria 62B may specify in a positive sense what is to be filtered (listed as non-mobility causations), or alternatively may specify in a negative sense what is not to be filtered (listed as mobility causations).

Various units or functionalities of FIG. 13, FIG. 13A, and FIG. 13B are shown as framed by broken line 70. The broken line 70 of FIG. 13, FIG. 13A, and FIG. 13B depicts example platforms which may host the enclosed units or functionalities. As used herein, the terminology "platform" is a way of describing how the functional units or entities framed thereby may be implemented or realized by machine, such as a machine including electronic circuitry. One example platform is a computer implementation wherein one or more of the elements framed by line 70 are realized by one or more processors 72 which execute coded instructions and which use non-transitory signals in order to perform the various acts described herein. In such a computer implementation the wireless terminal may comprise, in addition to a processor(s), a memory section, which in turn may comprise a random access memory; a read only memory; an application memory (a non-transitory computer readable medium which stores, e.g., coded non instructions which can be executed by the processor to perform acts described herein); and any other memory such as cache memory, for example. Typically the platform also comprises other input/output units or functionalities, such as a keypad; an audio input device, e.g., microphone; a visual input device, e.g., camera; a visual output device; and an audio output device, e.g., a speaker. Other types of input/output devices may also be connected to or comprise the wireless terminal. Another example platform suitable for the wireless terminal is that of a hardware circuit, e.g., an application specific integrated circuit (ASIC) wherein circuit elements are structured and operated to perform the various acts described herein.

While the foregoing discussion of FIG. 13A and FIG. 13B have featured a base station node as the node 20, it was mentioned above that, in other example embodiments and modes, the node 20 may instead be another type of radio access network node, such as a radio network controller or base station controller node. Although such radio network controller or base station controller node embodiments are not separately illustrated, the person skilled in the art will understand how to structure and operate such nodes in view of analogous structure of the nodes of FIG. 13A and FIG. 13B, subject to some modifications. In terms of modifications, for example, the interfaces of the radio network controller or base station controller node are different, since there is an interface to base station nodes as well as to the core network and possibly to other RNC nodes (e.g., an Iur interface). Yet such radio network controller or base station controller node may comprise a comparable units and functionalities as shown in FIG. 13A and FIG. 13B, or delegate at least some of such units or functionalities to other nodes such as the base station nodes served thereby. Further, it should be appreciated that in such radio network controller or base station controller node embodiments and modes the functionalities and units may be realized by or comprise a processor or machine platform as herein described.

It is the responsibility of the mobility robustness optimization (MRO) unit 52 to ensure that radio link failure (RLF) rate, handover failure (HOF) rate, and handover oscillation rate are kept at reasonable levels. The descriptions below identify how to separate radio link failure (RLF), handover failure (HOF) and HO oscillations due to mobility on one hand, and due to load balancing on the other hand. Without any loss of generality, similar procedure may be applied to other non-mobility causes, for example when retracting users to prepare for cell maintenance or restart/reconfiguration and due to cell outage including compensation means. In representative and non-limiting fashion the following sections focus on the mobility robustness optimization (MRO) and load balancing (LB) case.

3.1 Radio Link Failure (RLF)

Figure 14:
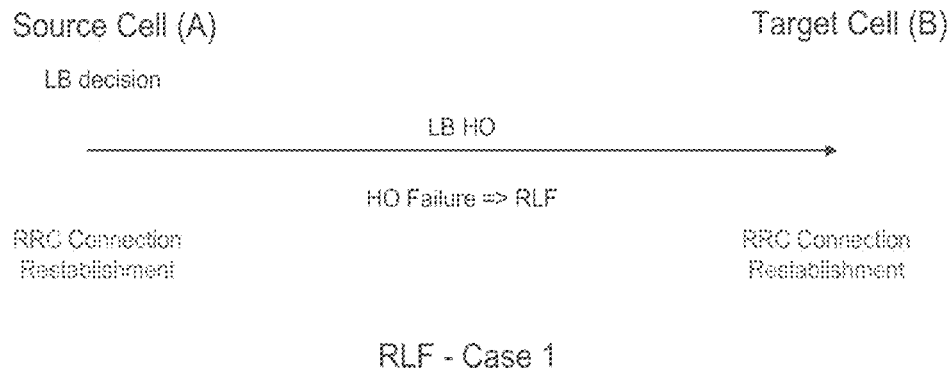

A Radio Link Failure (RLF) or handover failure (HOF) may occur in the following example cases:

RLF Case 1: As a result of a handover failure from the source cell (denoted as A) to the target cell (denoted as B), where the UE performs RRC Connection Reestablishment in either the source cell (A) or the target cell (B) as a result of the handover failure, as generally illustrated in FIG. 14.

Figure 15:
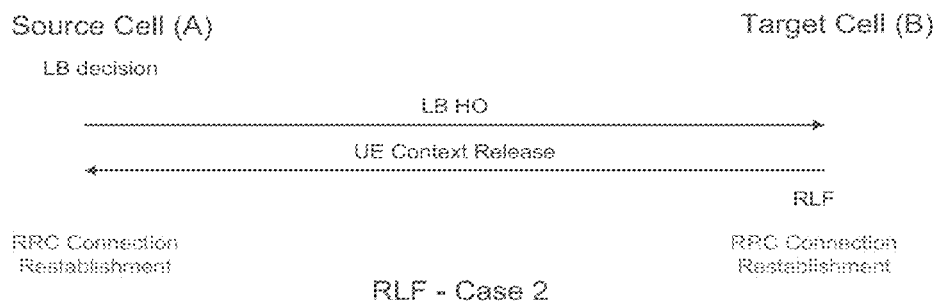

RFL Case 2: Following a successful handover, where the UE performs RRC Connection Reestablishment in either the source cell (A) or the target cell (B) as a result of a post-handover failure event (such as a radio link failure), as generally illustrated in FIG. 15.

Figure 16:
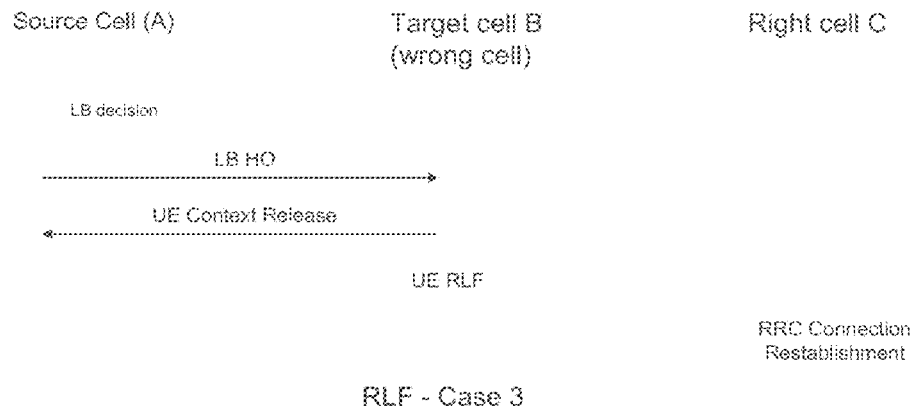

RLF Case 3: Following a handover whereby the UE RRC Connection Reestablishment occurs in a third cell, as generally illustrated in FIG. 16.

3.1.1 RLF Case 1

Figure 17:
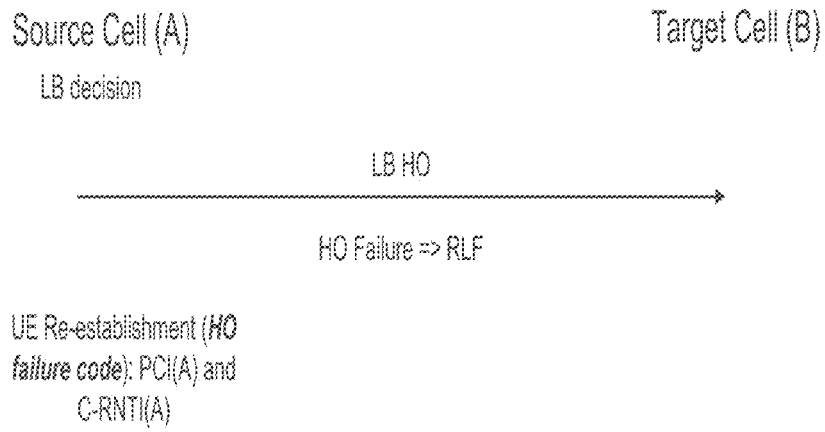

RLF Case 1 has a first subcase, shown in more detail in FIG. 17, where as a result of handover failure caused by a radio link failure, the UE performs RRC Connection Reestablishment in the source cell. In case the RRC Connection Reestablishment occurs in the source cell (A), then the UE will provide a handover failure code along with the PCI and C-RNTI of the UE in a message such as the RRCConnectionReestablishmentRequest message, which will enable the source cell to uniquely identify the UE. Normally, this would have resulted in the mobility robustness optimization (MRO) 52 detecting a too early handover. However, as the source cell knows that the handover was due to load balancing (by considering C-RNTI of the UE), then this failure cause, e.g., radio link failure (RLF), the non-mobility causation filter 24 will prevent the failure from being included in the data used by the MRO function 60.

As used herein, Cell Radio Network Temporary Identifier, C-RNTI, is a UE identifier allocated by a controlling RNC and it is unique within one cell controlled by the allocating CRNC. C-RNTI may be reallocated when a UE accesses a new cell with the cell update procedure.

Figure 18:
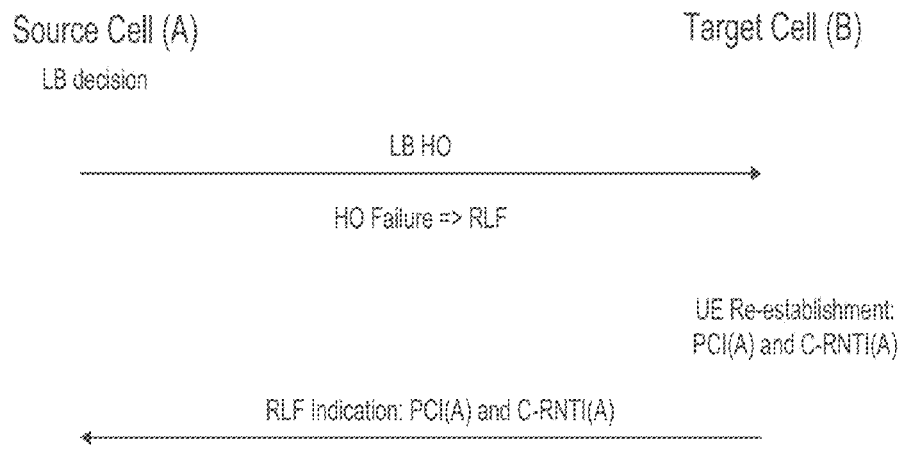

RLF Case 1 has a second subcase, shown in more detail in FIG. 18. In the second subcase illustrated in FIG. 18 (upon handover failure caused, e.g., by a radio link failure) the UE performs RRC Connection Reestablishment in the target cell. This results in the target cell sending an RLF INDICATION message to the source cell. Normally, this would have resulted in the mobility robustness optimization (MRO) unit 52 detecting a too late handover. The source cell knows that the handover was due to load balancing (by considering C-RNTI of the UE) as received in the RLF INDICATION message. Knowing that the handover was due to load balancing, the non-mobility causation filter 24 of mobility performance monitor 44 does not permit the radio link failure (RLF) to be fed to the MRO function 60.

3.1.2 RLF Case 2

RLF Case 2 has a first subcase, shown in more detail in FIG. 19. In the first subcase of FIG. 19 the UE performs RRC Connection Reestablishment in the source cell after the target cell has already released the UE context. In such case in which the RRC Connection Reestablishment occurs in the source cell (A), then the UE will provide the HO failure code along with the PCI of the target cell and C-RNTI of the UE in the RRCConnectionReestablishmentRequest message sent from the UE to the source cell. Since the target cell has released the context of the UE and is, as such, not aware of the UE, the source cell will send an RLF INDICATION message to the target cell with the indicated PCI and C-RNTI. The target cell, now knowing the UE as a result of receipt of the RLF INDICATION message, will send a handover report message indicating a too early handover and the cause of the handover (see Section 1.6). Once the source cell receives such Handover Report with cause mapping to load balancing (e.g., to reduce the load in serving cell), then the non-mobility causation filter 24 will not permit this radio link failure (RLF) to be fed to the MRO function 60.

RLF Case 2 has a second subcase, shown in more detail in FIG. 20. The second subcase of FIG. 20 is similar to the first subcase of FIG. 19, except that the UE performs RRC Connection Reestablishment in the target cell rather than in the source cell. This triggers the target cell to send an RLF INDICATION to the source cell indicating the UE by the C-RNTI and short MAC-I it had allocated in the source cell. This enables the source cell to associate the RLF INDICATION to the correct UE context and furthermore the handover cause. The non-mobility causation filter will then decide whether this failure will have an impact on the mobility robustness optimization (MRO) in the source cell.

3.1.3 RLF Case 3

RLF Case 3, shown in more detail in FIG. 21, is similar to RLF case 2 (see section 3.1.2) in the sense that a Handover Report is sent from the target cell (B) to the source cell. The UE had been directed to handover to the target cell (cell B), but target cell B proved to be the wrong cell for handover since the handover should instead have been to the better/right cell C. In such situation the UE performs RRC Connection Reestablishment in the right cell, i.e., cell C. Cell C then sends the RLF INDICATION message, including the PCI and the C-RNTI, to cell B. Cell B in turn sends a Handover Report message to source cell A, indicating that handover cause as being a handover to the wrong cell. Once the source cell receives such Handover Report with cause mapping to load balancing (e.g., reduce load in serving cell), then the non-mobility causation filter 24 will not permits this radio link failure (RLF) to be fed to the MRO function 60.

3.2 Handover Oscillation Rate

Figure 2:
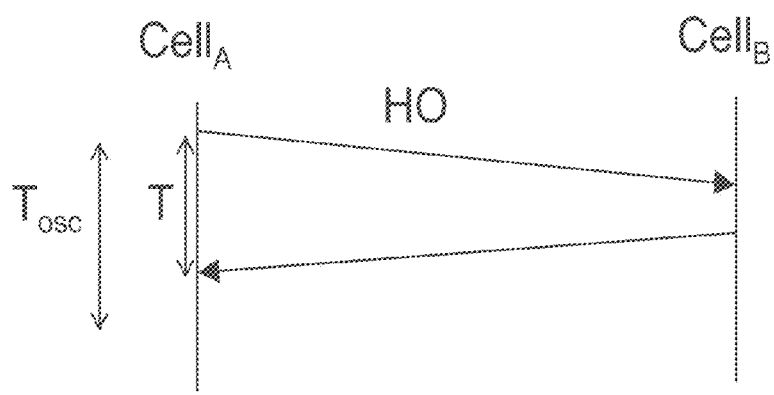
FIG. 2 is a diagrammatic view illustrating an oscillation.
Figure 3A:
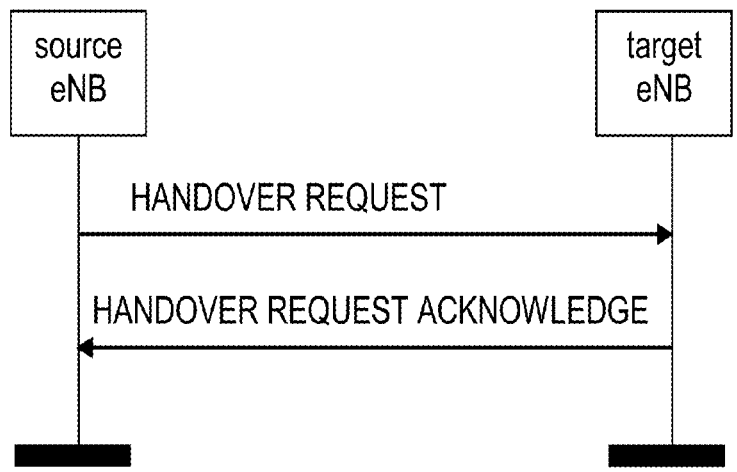
FIG. 3A is a diagrammatic illustrating a source cell successfully performing a HO Request over X2 AP.
Figure 3B:
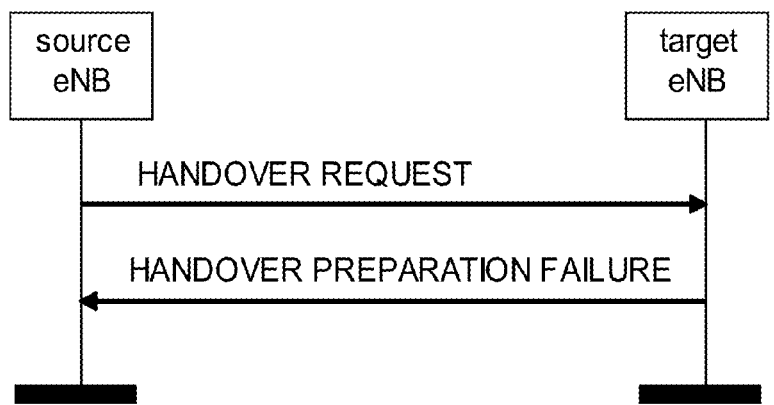
FIG. 3B is a diagrammatic illustrating a source cell performing a HO Request over X2 AP, and receiving a HO Preparation Failure in return.
Figure 4:
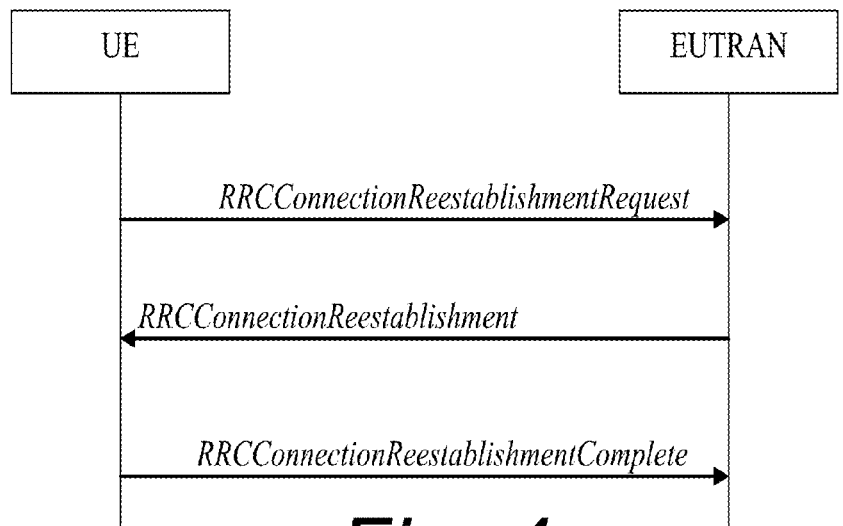
FIG. 4 is a diagrammatic illustrating a UE performing a RRC Connection Reestablishment, as may occur following a RLF or a HO failure.
Figure 5:
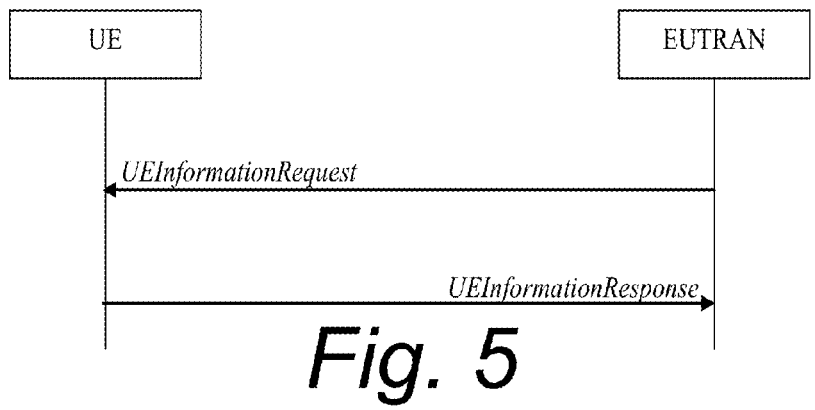
FIG. 5 is a diagrammatic illustrating a base station (BS) sending a UEInformationRequest message to a UE following an RRC Connection Reestablishment as a result of a radio link failure (RLF).
Figure 6:
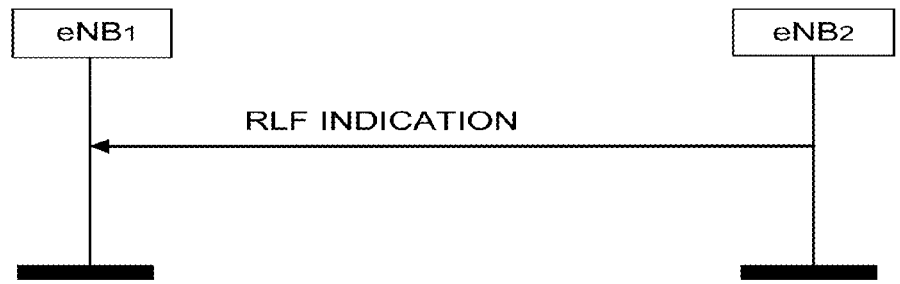
FIG. 6 is a diagrammatic illustrating a RLF indication.
Figure 7:
FIG. 7 is a diagrammatic illustrating an eNB sending a HANDOVER REPORT message to another eNB.

If two HOs are executed within the time period Tocs, as shown in FIG. 2, then this may be understood as HO oscillation. There may be two reasons for each of the two HOs, namely, signal strength variations (mobility), load balancing or other non-mobility causes. Considering plural consecutive handovers in general, there may be four cases (in the explanation of each of the following cases, the word "and" delineates the nature and reasons for the two consecutive handovers):

1: Source cell->target cell due to mobility and target cell->source cell due to mobility.
2: Source cell->target cell due to non-mobility cause and target cell->source cell due to mobility.
3 Source cell->target cell due to mobility and target cell->source cell due to non-mobility cause.
4 Source cell->target cell due to non-mobility cause and target cell->source cell due to non-mobility cause.

Figure 22:

Since in cases 2-4 load balancing is involved in the handovers, then these cases should not be accounted for in MRO, i.e., these HO oscillations will not be fed to the MRO function 60. As such, the only case where oscillations are fed to the MRO function 60 is case 1, which is also depicted by FIG. 22.

3.3 Non-Mobility Causes

As understood and used herein, non-mobility causes include:

3.3.1 Load balancing per individual UE, which means that statistics associated to these specific UEs are not included in the MRO statistics (e.g., maintained by mobility robustness statistics operation 60).

3.3.2 Load balancing via handover parameters, triggered to alleviate overload of one cell by retracting users to other neighboring cells. During the compensation period, users moved not due to handover parameters for regular mobility are excluded from the MRO statistics (e.g., maintained by mobility robustness statistics operation 60).

3.3.3 Retracting users to prepare for cell maintenance or restart/reconfiguration. This includes change of cell operational carrier, change of physical cell identifier and associated physical signals, software upgrade, module restarts as part of automatic self-healing.

3.3.4 Cell outage and its compensation. When a cell is in outage, some mobiles will obtain other serving cells. Moreover, this may be facilitated by reducing uplink interference, changing antenna tilts, increasing pilot power levels, etc. During such periods of time, the changes of serving cell is not mainly due to normal mobility, and therefore, the statistics should be excluded from the MRO statistics (e.g., maintained by mobility robustness statistics operation 60).

3.3.5 Admission rejects. When a handover is rejected due to lack of resources or capabilities in the target cell, then this may eventually lead to radio link failures. The UE may initiate a RRC Re-establishment in the target cell, from which the target cell can disclose that this UE previously was rejected, and no RLF report is sent to the source cell. Thereby, the statistics should be excluded from the MRO statistics (e.g., maintained by mobility robustness statistics operation 60).

4.0 Network Management

Figure 8:
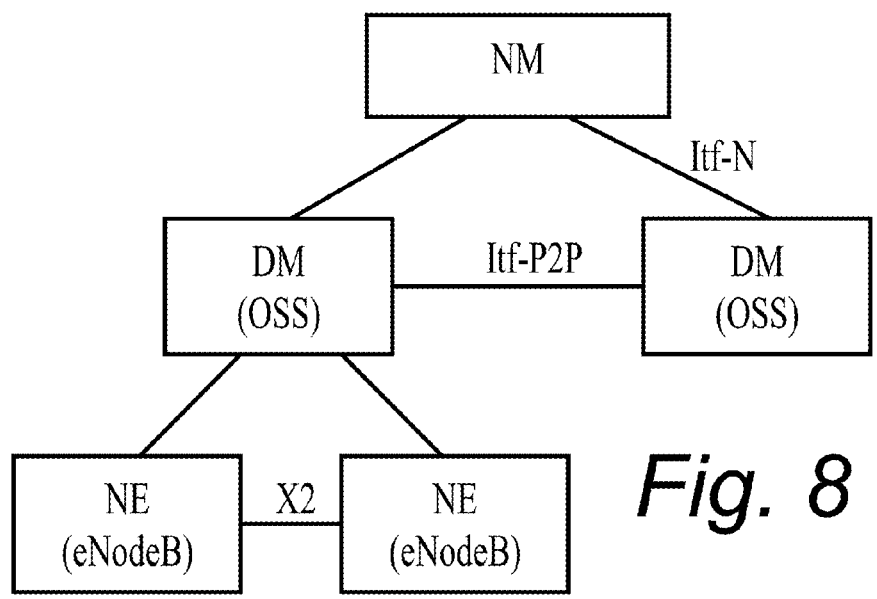
FIG. 8 is a diagrammatic view illustrating an example network management system which, in an example implementation, may be used by the technology disclosed herein.
Figure 9:
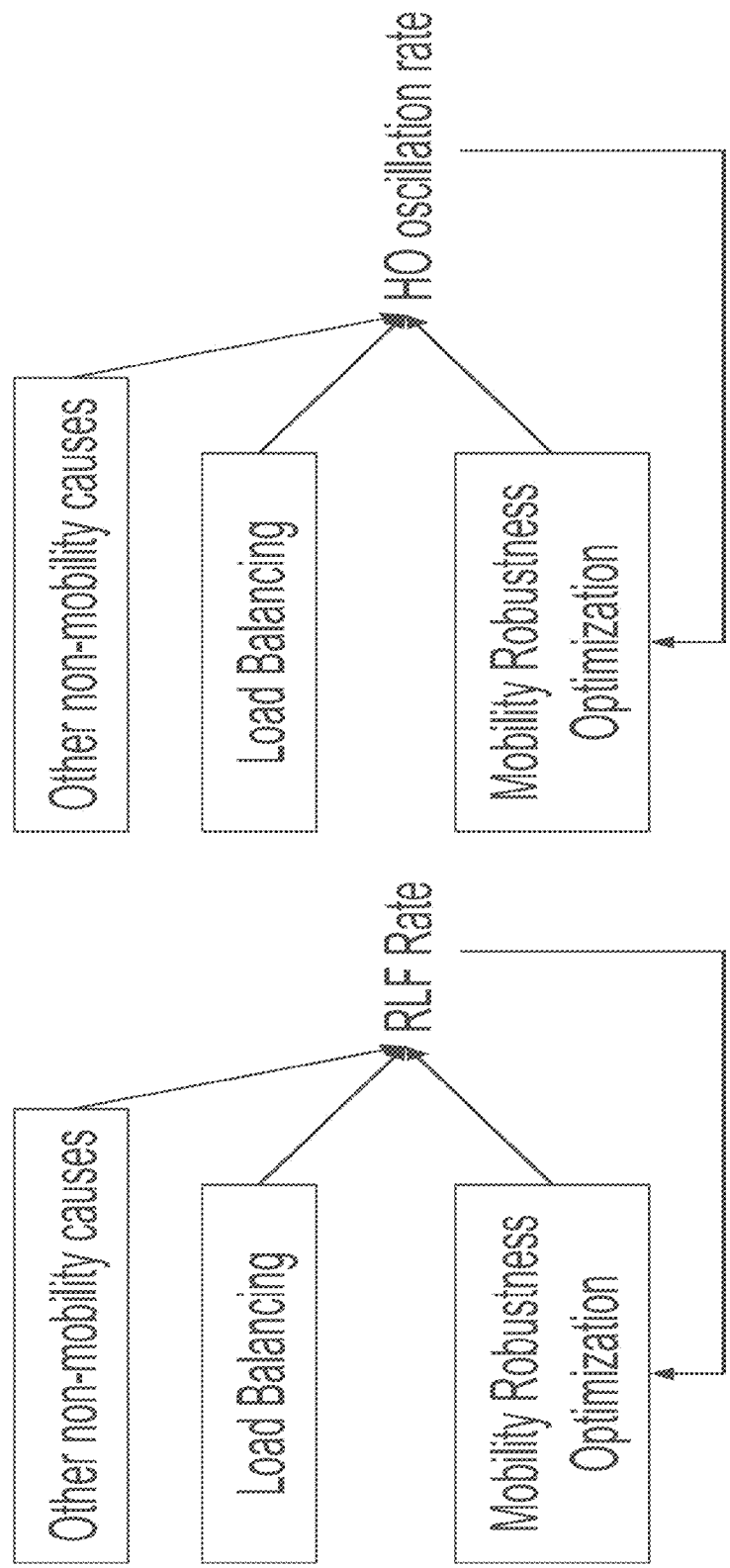
FIG. 9 is a diagrammatic view illustrating how, in a current approach, mobility robustness optimization (MRO), and other non-mobility causes impact radio link failure (RLF), handover failure (HOF), and HO oscillation rate.

The technology disclosed herein assumes a network management system such as that shown in FIG. 8. The node elements (NE), also referred to as eNodeB, are managed by a domain manager (DM), also referred to as the operation and support system (OSS). A DM may further be managed by a network manager (NM). Two NEs are interfaced by X2, whereas the interface between two DMs is referred to as Itf-P2P.

5.0 Statistics Sent to Operator

Figure 23:
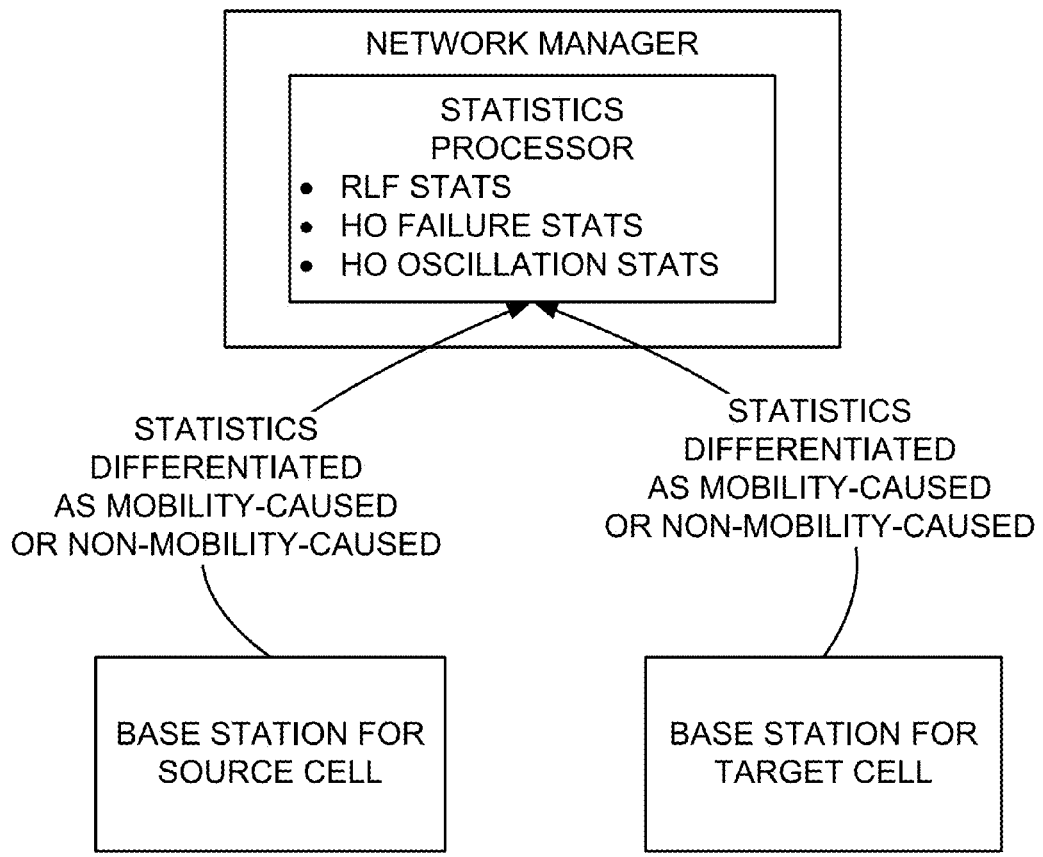
FIG. 23 is a diagrammatic view illustrating an example network management system collecting statistics which are differentiated as mobility-caused and non-mobility caused.

FIG. 23 shows that base stations for source cells and base stations for target cells may be connected (e.g., through the domain manager (DM)) to a network manager (NM) or operator in the manner shown in FIG. 8. The separation of causes of radio link failure (RLF), handover failure (HOF), and HO oscillation may not only be used by mobility robustness optimization (MRO) on one hand and load balancing and non-mobility causes on the other, but also to provide appropriate Key Performance Indicators (KPIs) to the operator. This enables the operator to understand the reasons of radio link failure (RLF), handover failure (HOF), and HO oscillations, i.e., whether these are due to mobility, load balancing, or other non-mobility issues. Thus, in sending statistics to the network manager or operator, such as to a statistics processor or the like of the network manager, each base station may differentiate between statistics reflecting events (e.g., radio link failure (RLF), handover failure (HOF), and handover oscillation) that are mobility-caused, and those which are non-mobility caused. The differentiation is facilitates by the non-mobility causation filter 24, which separates the causes into mobility-related and non-mobility related causes.

In Case 1 (section 3.1.1) the source cell that reports radio link failure (RLF) to the operator and in Case 2 (section 3.1.2) the target cell reports RLF to the operator. In any case, the source cell and target cell may through the method described in section 3.1 distinguish between RLFs due to mobility or load balancing. In the latter case RLFs due to load balancing are marked with an appropriate cause mapping to load balancing, e.g., Reduce Load in Serving Cell.

Several types of radio link failure (RLF) (and similarly handover failure (HOF)) statistics may be provided to the operator:

Radio link failure (RLF) statistics due to mobility, which may further comprise radio link failure (RLF) due to too early, too late, or to wrong cell.

RLF statistics due to load balancing (LB).

RLF statistics due to other non-mobility causes, separated per cause.

Similarly, HO oscillations are distinguished in several categories:

HO oscillations due to mobility
HO oscillations due to LB
HO oscillations due to other non-mobility causes, separated per cause Statistics may be sent to the operator (e.g., network manager (NM)) via the Itf-N interface, see Section 1.11 and FIG. 8.

The NM or DM may also configure the non-mobility causations in the eNB to enable it to separate between mobility and non-mobility causations.

While at least some of the foregoing embodiments concern implementation in a base station node, e.g., NodeB or eNB, as mentioned above in other example embodiments and modes the technology disclosed herein may instead be implemented in a radio network controller or base station controller, which is in turn controlling base stations, and is responsible for mobility and some non-mobility mechanisms.

6.0 Example Abbreviations

The following is a list of example abbreviations employed herein:

DFT-S-OFDM: discrete Fourier transform spread OFDM
DL: Downlink
DM: Domain Manager
eNB: eNodeB
E-UTRAN: Evolved Universal Terrestrial Radio Access Network
GERAN: GSM EDGE Radio Access Network
GSM: A second generation mobile communications system
HO: Handover
Itf-N: A 3GPP standardized northbound management interface.
LTE: Long Term Evolution
NE: Node Element
NM: Network Manager
OFDM: orthogonal frequency division multiplexing
OSS: Operation and Support System
PM: Performance monitoring
RAN: Radio Access Network
RSRP: Reference Signal Received Power
RSRQ: Reference Signal Received Quality
S1: The SAE—eNB interface
SAE: System Architecture Evolution
SINR: Signal to Interference and Noice Ratio
SQI: Service Quality Index
UE: User Equipment
UTRAN: A third generation mobile communications system
X2: The eNB—eNB interface 7.0 Example References The following references may be of technical interest and are incorporated herein by reference in their entireties:

[1] NGMN, "Operator Use Cases related to Self Organising Networks," ver. 1.53, 2007-04-16.

[2] 3GPP TR 36.300, Evolved Universal Terrestrial Radio Access (E-UTRA) and Evolved Universal Terrestrial Radio Access (E-UTRAN); Overall description; Stage 2, V8.2.0.

[3] Zhiqiang Liu, Peilin Hong, Kaiping Xue, Min Peng, "Conflict Avoidance between Mobility Robustness Optimization and Mobility Load Balancing", 2010 IEEE Global Telecommunications Conference, GLOBECOM 2010

[4] A coordination framework for self-organisation in LTE networks, L.C. Schmelz, M. Amirijoo, A. Eisenblatter, R. Litjens, M. Neuland and J. Turk, IM 2011, Dublin, Ireland, May 23-27, 2011.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node of a telecommunications system characterized as being configured to exclude, from a mobility robustness optimization operation, a handover issue event that has non-mobility causation, wherein the handover issue event comprises a radio link failure (RLF), a handover failure (HOF), or a handover oscillation.

2. The apparatus of claim 1, wherein the node comprises:
a mobility robustness unit configured to maintain mobility robustness statistics; and
a non-mobility causation filter configured to exclude the handover issue event that has non-mobility causation from statistics maintained by the mobility robustness unit.

3. The apparatus of claim 2, further comprising:
a handover unit configured to control performance of a handover of a wireless terminal in dependence on a value of a handover parameter;
wherein the mobility robustness unit is configured to adjust the value of the handover parameter in dependence on the statistics.

4. The apparatus of claim 2, further comprising an electronic circuit which comprises the mobility robustness unit and the non-mobility causation filter.

5. The apparatus of claim 1, wherein the non-mobility causation comprises an event not due to radio condition changes related to mobility.

6. The apparatus of claim 1, wherein the non-mobility causation comprises load balancing; retraction of users for cell maintenance and/or restart/reconfiguration purposes; cell outage; and, admission rejection.

7. The apparatus according to claim 1, wherein the node is a source base station (BS) node, and wherein the node is configured to determine that the handover issue event has the non-mobility causation upon receiving a handover failure code and a Cell Radio Network Temporary Identifier (C-RNTI) of the wireless terminal from the wireless terminal upon occurrence of radio resource control (RRC) Connection Establishment in the source base station (BS) node.

8. The apparatus according to claim 1, wherein the node is a source base station (BS) node, and wherein the node is configured to determine that the handover issue event has the non-mobility causation upon receiving a radio link failure (RLF) indication message from a target cell upon occurrence of the wireless terminal performing radio resource control (RRC) Connection Establishment in the target cell, the radio link failure (RLF) indication message including a Cell Radio Network Temporary Identifier (C-RNTI) of the wireless terminal.

9. The apparatus according to claim 1, wherein the node is a source base station (BS) node, and wherein the node is configured to receive a handover report from another cell and determining from a handover cause indicator in the handover report that the handover issue event has the non-mobility causation.

10. A method of operating a node of a telecommunications system comprising:
    determining if a handover issue event for a wireless terminal has non-mobility causation; and, if so,
    excluding the handover issue event from a mobility robustness operation, wherein the handover issue event comprises a radio link failure (RLF), a handover failure (HOF), or a handover oscillation.

11. A method according to claim 10, wherein the mobility robustness operation comprises a mobility robustness statistics operation.

12. A method according to claim 10, further comprising using the mobility robustness operation to adjust a handover parameter.

13. A method according to claim 10, wherein the non-mobility causation comprises an event not due to radio condition changes related to mobility.

14. A method according to claim 13, wherein the non-mobility causation comprises load balancing; retraction of users for cell maintenance and/or restart/reconfiguration purposes; admission rejection, and cell outage.

15. A method according to claim 10, wherein the node is a source base station (BS) node, and further comprising the node determining that the handover issue event has the non-mobility causation upon receiving a handover failure code and a Cell Radio Network Temporary Identifier (C-RNTI) of the wireless terminal from the wireless terminal upon occurrence of radio resource control(RRC) Connection Establishment in the source base station (BS) node.

16. A method according to claim 10, wherein the node is a source base station (BS) node, and further comprising the node determining that the handover issue event has the non-mobility causation upon receiving a radio link failure (RLF) indication message from a target cell upon occurrence of the wireless terminal performing radio resource control (RRC) Connection Establishment in the target cell, the radio link failure (RLF) indication message including a Cell Radio Network Temporary Identifier (C-RNTI) of the wireless terminal.

17. A method according to claim 10, wherein the node is a source base station (BS) node, and further comprising the node receiving a handover report from another cell and determining from a handover cause indicator in the handover report that the handover issue event has the non-mobility causation.

18. A method according to claim 10, wherein information regarding what constitutes the non-mobility causation is obtained from a source which is external to the node.

19. A method according to claim 10, wherein information regarding what constitutes a mobility causation is obtained from a source which is external to the node, and wherein the non-mobility causations are causations not included in the mobility causation list.

20. A method in a communication system in association with a handover parameter tuning mechanism based on mobility statistics, comprising:
    identifying if a handover issue event is associated to a non-mobility cause; and if so
    excluding the identified handover issue event data from mobility statistics; wherein the handover issue event comprises a radio link failure (RLF), a handover failure (HOF), or a handover oscillation.

21. A method according to claim 20, wherein the handover issue event associated to a non-mobility cause is associated to one or more of load balancing, overload management, base station maintenance preparation, cell outage, admission rejection, and self-healing management.

22. A method according to claim 20, wherein mobility statistics with identified handover issue events excluded are presented as performance statistics.

23. A method according to claim 20, wherein excluded identified handover issue events are presented as separate statistics.

24. A method according to claim 20, further comprising determining that the handover issue event has the non-mobility causation upon a node receiving a handover failure code and a Cell Radio Network Temporary Identifier (C-RNTI) of the wireless terminal from the wireless terminal upon occurrence of radio resource control (RRC) Connection Establishment in the source base station (BS) node.

25. A method according to claim 20, further comprising determining that the handover issue event has the non-mobility causation upon a node receiving a radio link failure (RLF) indication message from a target cell upon occurrence of the wireless terminal performing radio resource control (RRC) Connection Establishment in the target cell, the radio link failure (RLF) indication message including a Cell Radio Network Temporary Identifier (C-RNTI) of the wireless terminal.

26. A method according to claim 20, further comprising a node receiving a handover report from another cell and determining from a handover cause indicator in the handover report that the handover issue event has the non-mobility causation.

\* \* \* \* \*

UNITED STATES PATENT AND TRADEMARK OFFICE
CERTIFICATE OF CORRECTION

PATENT NO. : 8,738,004 B2
APPLICATION NO. : 13/503506
DATED : May 27, 2014
INVENTOR(S) : Amirijoo et al.

It is certified that error appears in the above-identified patent and that said Letters Patent is hereby corrected as shown below:

In the Specification

In Column 4, Line 8, delete "51" and insert -- S1 --, therefor.

In Column 4, Lines 32-33, delete "UElnformationRequest" and insert -- UEInformationRequest --, therefor.

In Column 4, Lines 35-36, delete "UElnformationRequest" and insert -- UEInformationRequest --, therefor.

In Column 6, Line 26, delete "itself" and insert -- itself. --, therefor.

In Column 8, Line 40, delete "UEInformationRequest" and insert -- UEInformationRequest --, therefor.

In Column 9, Line 26, delete "thereof" and insert -- thereof. --, therefor.

In Column 14, Line 30, delete "(MRO)" and insert -- (MRO) unit --, therefor.

In the Claims

In Column 19, Line 37, in Claim 11, delete "A" and insert -- The --, therefor.

In Column 19, Line 40, in Claim 12, delete "A" and insert -- The --, therefor.

In Column 19, Line 43, in Claim 13, delete "A" and insert -- The --, therefor.

In Column 19, Line 46, in Claim 14, delete "A" and insert -- The --, therefor.

Signed and Sealed this
Seventh Day of April, 2015

Michelle K. Lee
*Director of the United States Patent and Trademark Office*

CERTIFICATE OF CORRECTION (continued)
U.S. Pat. No. 8,738,004 B2

In Column 19, Line 50, in Claim 15, delete "A" and insert -- The --, therefor.

In Column 19, Line 58, in Claim 16, delete "A" and insert -- The --, therefor.

In Column 20, Line 6, in Claim 17, delete "A" and insert -- The --, therefor.

In Column 20, Line 13, in Claim 18, delete "A" and insert -- The --, therefor.

In Column 20, Line 16, in Claim 19, delete "A" and insert -- The --, therefor.

In Column 20, Line 30, in Claim 21, delete "A" and insert -- The --, therefor.

In Column 20, Line 35, in Claim 22, delete "A" and insert -- The --, therefor.

In Column 20, Line 38, in Claim 23, delete "A" and insert -- The --, therefor.

In Column 20, Line 41, in Claim 24, delete "A" and insert -- The --, therefor.

In Column 20, Line 48, in Claim 25, delete "A" and insert -- The --, therefor.

In Column 20, Line 57, in Claim 26, delete "A" and insert -- The --, therefor.